July 16, 1963     E. T. WAYNE     3,097,391
UNLOADING DEVICES FOR CHICKEN SHACKLES
Filed Oct. 28, 1960     2 Sheets-Sheet 2
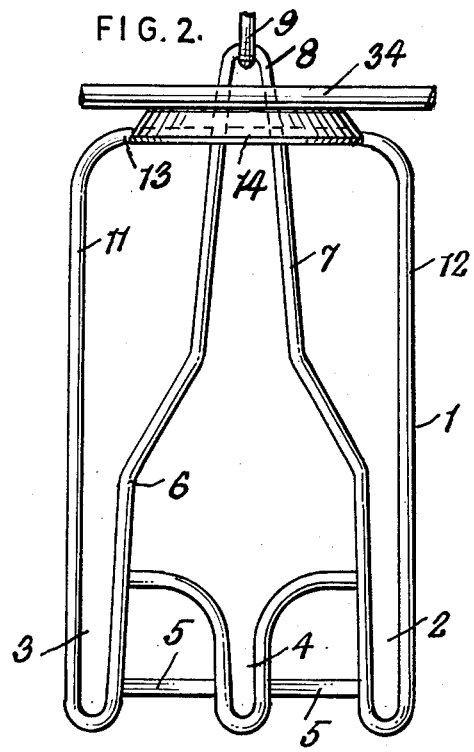
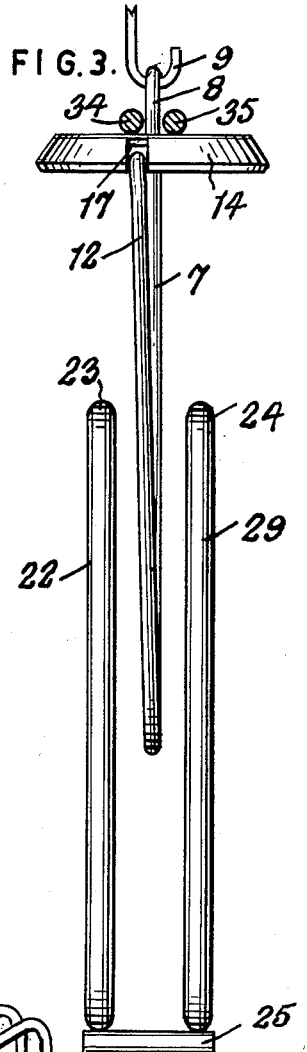
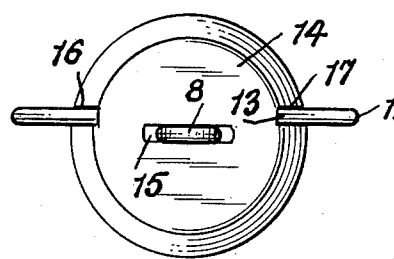
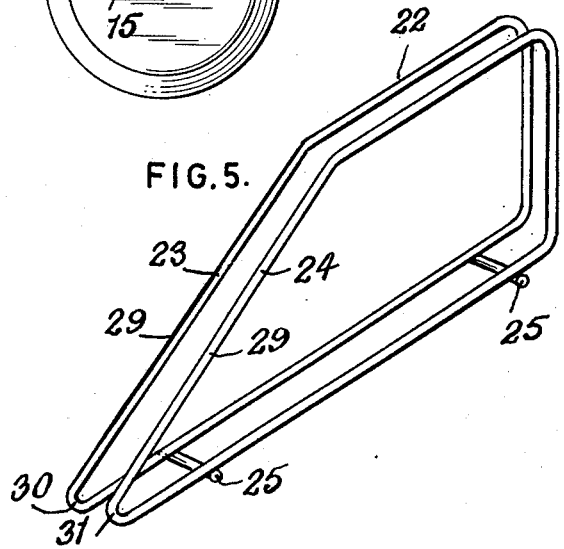
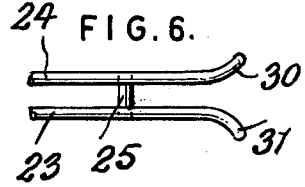
INVENTOR
Edward T. Wayne
BY Harry Radzwisky
ATTORNEY United States Patent Office 3,097,391
Patented July 16, 1963

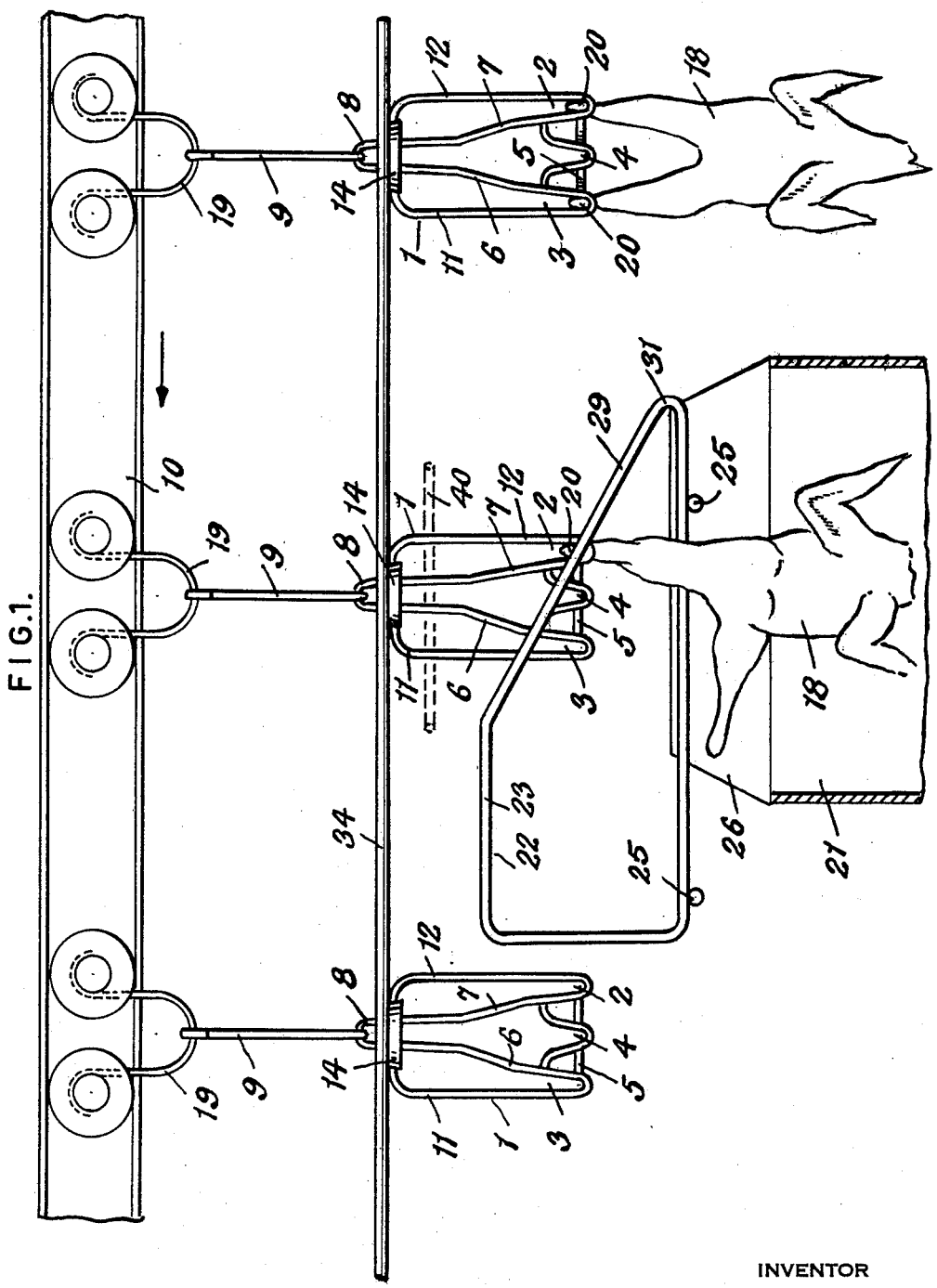

3,097,391
UNLOADING DEVICES FOR CHICKEN SHACKLES
Edward T. Wayne, Port Crane, N.Y., assignor to E. H. Titchener & Co., Binghamton, N.Y., a corporation of New York
Filed Oct. 28, 1960, Ser. No. 65,794
8 Claims. (Cl. 17—11)

This invention relates to unloading or discharging devices, and more particularly to devices employed for freeing poultry such as chickens, from the shackles in which they are suspended while being killed, scaled, picked or otherwise treated during processing operations.

Various automatic release devices have been proposed, and by which parts of the shackle that grip the fowl are opened or spread apart to release the fowl from the shackle. Sticking or jamming of the moving parts of such devices often result in the failure to completely release the fowl. The devices are also subjected to heat and moisture and this, coupled with the repeated pressure imposed on springy or resilient parts of the device, often causes such elements to lose their tension, and the shackle to become either wholly inoperative or uncertain in operation.

As a result, the rigid type of shackle, or one having no moving parts or springs, has obtained popularity. It can be easily cleaned; it is of rigid, sturdy construction; has a long life of hard use and is effective and non-failing in operation. A problem which has confronted the industry is that of providing means for automatically discharging or releasing the chickens from this type of shackle, and it is one of the objects of the present invention to provide such means.

It is another object of the invention to provide an unloading device from which the chickens will be discharged at an unloading point during travel of the shackles by raising or elevating each chicken to an extent required to cause it to fall out of the shackle.

More particularly, the invention contemplates the provision of means for transporting the shackles, each of which carries a chicken, to an unloading point where stationary cam elements contact the parts of the chicken which are engaged by the shackle and protrude therefrom, and which cam elements elevate the chicken to an extent to cause it to become disengaged from the shackle and be deposited on a chute or in a suitably positioned collection receptacle. Means are also provided by which each shackle is held against rising movement during the ejection of the chicken.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is an elevational view, showing the improved chicken-unloading apparatus;

FIG. 2 is a front elevational view of one of the shackles and a portion of one of the guide bars or rods;

FIG. 3 is a side elevational view of one of the shackles, showing how the same fits between the loop members of the unloading frame;

FIG. 4 is a top plan view of one of the shackles;

FIG. 5 is a perspective view of the unloading frame; and

FIG. 6 shows the forward portion of the unloading frame slightly modified to facilitate the guiding of the shackles between its rods.

Referring to the drawings and particularly to FIGS. 1 and 3 wherein is shown a type of shackle especially adapted for use in connection with the improved unloading device to be described. This type of shackle resembles in many respects the shackle shown in my Patent No. 2,613,390 dated October 14, 1952.

The shackle includes a frame generally indicated at 1, which is preferably made of non-corrosive metal or of metal treated to render it corrosion-resistant. The frame 1 is so shaped as to provide a pair of notches 2 and 3 intended for the reception of the legs of the chicken to thereby suspend the chicken from the shackle in a manner shown at the right in FIG. 1. A central notch 4 is located between the notches 2 and 3, the notch 4 receiving the neck of the fowl so that the fowl can be suspended by either the neck or legs or both when desired. The frame thus formed may, if desired, be stiffened by cross members 5 which, when embodied in the frame, extend between the leg notches 2 and 3 and the neck-receiving notch 4. The frame includes inner members 6 and 7 which extend upwardly and terminate at the top in a suspension loop 8 through which a hook 9 extends. Said hook 9 is employed to hang the shackle from a conveyor, a portion of which is shown at 10 in FIG. 1. Other means of conventional form, may if desired, be employed for the suspension of the shackle. The frame 1 of the shackle also includes outer rods 11 and 12 provided at the top with an integral connecting cross piece 13 to which is welded or otherwise secured an inverted cup-shaped metal plate or disk 14. The disk or plate 14 need not necessarily be made in the form shown, as a plate of other shape can be used.

Provided in the top of the plate or disk 14 is a slot 15 through which the suspension loop 8 extends and the disk or plate is notched at diametrically opposite points as indicated at 16 and 17 to allow the cross piece 13 to pass through the side wall of the disk and extend across the under side of the disk.

At the right in FIG. 1 is shown a chicken 18 suspended from one of the shackles, the shackle being hung from a loop 19 on the conveyor by means of the suspension hook 9. The chicken there shown has its legs engaged in the notches 2 and 3 and as thus suspended it is carried, after having been processed or at any point in its processing, to an unloading point where it is discharged from the shackle to drop onto a chute, or to be deposited into a suitable collection receptacle such as is shown at 21 in FIG. 1.

Disposed above the chute or receptacle is a stationarily mounted unloading frame generally indicated at 22. In the form shown, the frame includes a pair of similar metallic rods or loops 23 and 24 spaced apart for a sufficient distance to allow the shackles to pass between them as indicated in FIG. 3. The two loops 23 and 24 are maintained in the required spaced relation by means of cross rods 25 welded or otherwise secured to the bottom stretches of the loops. The top stretch of each of the loops 23 and 24 is formed with an inclined portion 29, which portions operate cam-like to engage against the legs or the neck, or against the legs and neck of the chicken held in the shackle, while the shackle passes between the loops 23 and 24, and raise the chicken so that the legs and/or neck will be elevated out of the notches 2, 3 and 4 to thereby disengage the legs and/or neck from the notches to an extent to free the chicken from the shackle, allowing the chicken to fall down on a chute 26 and into the collection receptacle 21 or to be carried away by a chute or conveying means to a point of removal. A chicken being partially discharged from one of the shackles is shown in the central portion of FIG. 1. In the event the chicken is suspended solely by its neck rather than by its feet, the neck located in the central notch 4 will be freed by the elevating movement of the chicken as above described.

To insure the accurate and positive entry of each of the shackles between the loops 23 and 24 of the unloading frame, the forward or nose portions 30 and 31 of these loops can, if necessary, be made slightly divergent or outwardly splayed as disclosed in FIG. 6, these divergent parts serving to guide the shackles readily in place between the loops.

When the lifting movement required to discharge a chicken from a shackle is imparted in to the chicken by contact with the inclined cam elements 29, it is essential that the shackle in which the chicken is held be maintained against elevating movement, lest both the chicken and the shackle be raised together, as a result of which the chicken will not be separated from the shackle. To restrain the shackles against rising movement, a pair of spaced-apart, parallel guide bars or rods 34 and 35 is provided, these guide bars being stationarily mounted in any suitable way and so positioned that they rest against the tops of the plates or disks 14 provided on the shackles. While a chicken is being elevated in a manner to detach it from the shackle, the shackle is thus held against the bars or rods 34 and 35 and restrained from rising. The shape of the plate or disk 14 is such as to permit it to easily enter under the rods or bars 34 and 35 and slide along while held against the rods or bars during the travel of the shackles.

In addition to maintaining the shackles against raising movement it is essential that the shackles be so guided that each of the same, when reaching the unloading or discharge frame 22 shall be so positioned that it will unfailingly pass between the two loops 23 and 24 of the frame. That is to say, the plane of the shackle must be maintained parallel to the plane of the frame, when each shackle reaches the frame. To prevent the shackles from becoming disaligned with respect to the frame 22, a portion of each shackle, namely, the suspension loop 8, is extended between and is guided by the parallel rods or bars 34 and 35. In its travel, this portion of each shackle moves along between the rods on bars and the shackle is thus prevented from rotating or swivelling around a vertical axis. As a result, each shackle is held in a non-rotative condition while it is moved along by the conveyor and it is thus readily moved between the two loops 23 and 24.

While the two parallel bars or rods 34 and 35 may be found sufficient to maintain the shackles against rotative movement around a vertical axis, additional guide means can, if found necessary or desirable, be used. In such case, a pair of spaced, parallel rods 40 similar to the rods 34 and 35, can be located above the discharge point and below the rods 34 and 35, the rods 40 permitting the shackle to pass between them while co-operating with the rods 34 and 35 in keeping each shackle from rotative movement while it passes between the loops 23 and 24.

Additional guide means can also be provided when necessary. For example, a deflector can be used to prevent the possibility of parts of the chicken entering through the loops 23 and 24 rather than riding along the outside of the loops.

In operation, the chickens, after having been processed, are carried by the conveyor in the direction of the arrow in FIG. 1. Each chicken-carrying shackle, upon reaching the unloading frame 22, passes between the rods 23 and 24 thereof, while the inclined surfaces 29 take under the legs and/or neck of the chicken extending through the shackle, and raise the chicken to an extent sufficient to cause the shackle-engaging parts to be lifted out of the notches in the shackle and the chicken resultantly freed from the shackle and caused to fall on a chute or into a collection receptacle.

Having thus described a single embodiment of the invention, it is obvious that the same is not to be restricted thereto, but is broad enough to cover all structures coming within the scope of the annexed claims.

What I claim is:

1. An unloading device for chicken shackles comprising, a conveyor for a chicken-bearing shackle, the shackle having notches through which parts of the chicken extend, a pair of spaced rods between which a shackle is moved by the conveyor, said rods having inclined portions which contact with the parts of the chicken that extend through the notches in the shackle and raise such parts in a manner to disengage the same from the notches and thereby free the chicken from the shackle.

2. An unloading device as provided for in claim 1, including means for engaging the shackle during its travel and preventing raising movement of the shackle while the parts of the chicken are being raised by engagement with the inclined parts of the rods.

3. An unloading device for chicken shackles comprising, means for transporting a shackle, the shackle having notches through which parts of a chicken are extended in a manner to hold the chicken in the shackle, the shackle being provided at the top with a plate, a frame consisting of a pair of spaced rods between which the shackle is moved during its travel, said frame including an inclined upper edge on each of its rods which engages cam-like against the parts of the chicken when the shackle is moved between the rods and elevates the chicken to raise its parts out of the notches in the shackle and thereby completely disengage the chicken from the shackle, and means above the plate and against which the plate contacts to prevent raising movement of the shackle while the chicken is being disengaged therefrom.

4. An unloading device as provided for in claim 3, wherein the means above the plate consists of a pair of spaced rods, and the shackle has a portion of it located between and guided by the rods to thereby prevent rotative movement of the shackle about a vertical axis.

5. An unloading device as provided for in claim 3, wherein the rods which form the chicken-engaging frame are splayed outwardly at the forward end of said frame to facilitate the guiding of the shackle between the rods.

6. An unloading device for chicken shackles comprising, a conveyor on which a chicken-carrying shackle is transported and from which the shackle is suspended, the chicken being suspended in the shackle by parts of the chicken extending through notches formed in the shackle, a discharging device having spaced, stationary metallic-rod loops between which the shackle is carried by the conveyor, said loops having inclined cam surfaces for engaging against those parts of the chicken which extend through the notches in the shackle and elevating such parts out of the notches and the chicken thereby disengaged from the shackle, and means for restraining the shackle from rising movement.

7. An unloading device for chicken shackles comprising, means for conveying a shackle in which a chicken is carried, said shackle having a top fixed cam means in the path of travel of the shackle and positioned to engage against parts of the chicken and impart a raising movement to it so that the chicken becomes disengaged from the shackle, the shackle having an inverted cup at its top, and rods between which a part of the shackle extends and against which the cup is operative to prevent raising movement of the shackle.

8. An unloading device for chicken shackles comprising, means for moving a shackle in which a chicken is held, fixed abutments presenting inclined surfaces in the path of movement of the chicken and contacting with the chicken during travel of the shackle and causing the chicken to be disengaged from the shackle, the shackle having an upper portion provided with an inverted cup-shaped disk, spaced bars located above the shackle and between which portions of the shackle extend to prevent swivelling movement of the shackle around a vertical axis, the cup contacting with the bars and serving to hold the shackle against raising movement while the chicken is being separated from the shackle.

References Cited in the file of this patent
UNITED STATES PATENTS

| | | |
|---|---|---|
| 1,760,392 | Arminger | May 27, 1930 |
| 2,617,145 | Davis | Nov. 11, 1952 |
| 2,810,926 | Mitchell et al. | Oct. 29, 1957 |
| 2,929,097 | Corey et al. | Mar. 22, 1960 |